April 3, 1951 F. GRAY 2,547,386

CURRENT STORAGE DEVICE UTILIZING SEMICONDUCTOR

Filed March 31, 1949 5 Sheets-Sheet 1

INVENTOR
F. GRAY
BY Harry C. Hart
ATTORNEY

INVENTOR
F. GRAY
BY Harry C. Hart
ATTORNEY

April 3, 1951 F. GRAY 2,547,386

CURRENT STORAGE DEVICE UTILIZING SEMICONDUCTOR

Filed March 31, 1949 5 Sheets-Sheet 3

INVENTOR
F. GRAY
BY Harry C. Hart
ATTORNEY

CURRENT STORAGE DEVICE UTILIZING SEMICONDUCTOR

Filed March 31, 1949 5 Sheets-Sheet 4

INVENTOR
F. GRAY
BY Harry C. Hart
ATTORNEY

April 3, 1951 F. GRAY 2,547,386

CURRENT STORAGE DEVICE UTILIZING SEMICONDUCTOR

Filed March 31, 1949 5 Sheets-Sheet 5

INVENTOR
F. GRAY
BY Harry C. Hart
ATTORNEY

Patented Apr. 3, 1951

2,547,386

UNITED STATES PATENT OFFICE 2,547,386

CURRENT STORAGE DEVICE UTILIZING SEMICONDUCTOR

Frank Gray, East Orange, N. J., assignor to Bell Telephone Laboratories, Incorporated, New York, N. Y., a corporation of New York Application March 31, 1949, Serial No. 84,644

24 Claims. (Cl. 250—164)

This invention relates to the translation of electric currents and particularly to the utilization of semiconductor materials in a novel manner to translate the current of an electron beam.

A principal object of the invention is to initiate the flow of a persistent current by the application of a momentary electric impulse. A related object is to combine in a single structure the characteristics of amplification and memory.

Another object is to convert information in the form of a sequence of short electric impulses which appear on a single conductor and follow one another in time into a space pattern of electric conditions among a multiplicity of different conductors, which conditions can endure in substantial independence of the passage of time until they are deliberately altered by erasure.

In an application of John Bardeen, Serial No. 11,166 filed February 26, 1948, issued October 3, 1950 as Patent 2,524,033, there is described a translating device for electric currents which comprises a block of semiconductor material such as P-type silicon or N-type germanium having a first electrode plated over a substantial area of one face thereof and making low resistance contact with the body of the block, a point electrode engaging the opposite face, biased in the reverse direction, and a control electrode close to the semiconductor block and to the point electrode but insulated from each of them by a thin film of insulating material. It is found that application of a signal to the control electrode modifies the current flowing in an external work circuit through the block from the base to the point contact electrode and across a high resistance barrier which is believed to exist in the interior of the block. Best results are obtained when the control electrode actually surrounds the point contact electrode.

It is believed that the action of that device is due to the setting up of an electric field across the film of insulation, which field extends into the body of the semiconductor material and modifies the number of mobile charges in at least a thin layer of the semiconductor material immediately under the insulating film, and so the conductivity and resistance of this layer. Especially is this alteration significant in the immediate vicinity of the point contact electrode. Here, because the point contact electrode is worked in its reverse or high resistance direction, its contact resistance constitutes the major part of the resistance of a work circuit which interconnects the point contact electrode with the base, and therefore the controlling part.

In one aspect the present invention is based on the discovery that the control electrode of the aforementioned application of John Bardeen may be dispensed with, and that the film of insulation which covers the surface of the semiconductor material may be subjected to an equivalent or even a superior electric field by charging it directly without resort to any specific mechanical electrode, as by bombarding it with the electrons of a cathode beam. It has been found that a very short pulse of comparatively weak beam current, for example a 1/100 second pulse of current of 10 microamperes which supplies a charge of 1/10 microcoulomb, suffices to more than double the current flowing through the block to the collector; for example, to change it from less than .4 to more than .8 milliamperes.

In another aspect, the invention is based on the discovery that the current which flows through the block from the base electrode to the point contact of the collector electrode is a function not so much of the voltage or current of an input signal as of the electric charge on the dielectric insulating layer, so that a very fleeting pulse of current, which places such a charge on this layer and leaves it there after the current pulse has passed, suffices to produce an enduring change in the collector current. This altered value of the collector current persists as long as the surface charge remains, and its magnitude is substantially proportional to the magnitude of this charge. The charge itself may be deliberately removed at will, for example by again bombarding the surface with electrons of the same or another beam, but this time in the presence of a local field which withdraws secondary electrons in a ratio greater than unity. Thus a secondary anode may be disposed near to the surface of the block in position to receive secondary electrons which may be released from the surface in the course of its bombardment by beam electrons, being maintained at a positive potential with respect to the surface so that it collects substantially all of such secondary electrons. With such an arrangement the original surface charge may be erased and the collector electrode current restored to its original value substantially instantaneously.

In the absence of such deliberate erasure, the original surface charge leaks off, due to the small residual conductivity of the material of the insulating layer, and the collector current decays correspondingly. The rate of this decay depends principally on the character and thickness of the insulating layer. These may be controlled within wide limits in fabrication so that a translating device constructed in accordance with the invention may be informed with a short decay time or a long one to suit particular needs.

The invention lends itself readily to the construction of a beam tube distributor wherein the target comprises a multiplicity of such individual insulated semiconductor blocks, each with its properly biased point contact electrode and each with its individual secondary anode. The blocks may be arranged in any desired array such as a linear one or a circular, a spiral or a rectangular one, as desired. The electron beam may be directed onto one or other of these blocks by application of suitable signals to conventional beam-deflecting elements, and the beam itself may be turned on and off by application of a signal to a beam-modulating electrode. Individual loads such as relays may be included in the circuits of the several collector electrodes. Impact of the beam, when turned on, on any particular semiconductor block initiates the flow of current in the relay connected with its collector electrode; and this current persists long after the beam has moved on to cause similar initiation of currents in others of the relays. When the actuation of the relay has served its purpose, the relay may be restored to its original condition by application of a positive voltage to the appropriate secondary anode while the beam is directed onto the appropriate block. If standard persistence is desired, each relay may be restored after the lapse of a preassigned time by suitable adjustment of the decay time of the block. If simultaneous restoration of all of the relays is desired, a single secondary anode suffices, disposed to collect secondary electrons from any or all of the blocks.

Because of the fact that the area, on the block surface, of mutual influence between the beam-produced surface charge and the charge-sensitive collector is very small, the target may conveniently comprise a single large block or strip of semi-conductor material having a number of individual collector electrodes making point contact with its surface at spaced points.

The invention will be fully apprehended from the following detailed description of preferred embodiments thereof, taken in connection with the appended drawings, in which:

Fig. 1 is a schematic diagram of simplified apparatus embodying the invention;

Figs. 2 to 10, inclusive, are wave form diagrams of assistance in explaining the operation of the apparatus of Fig. 1;

Fig. 11 is a schematic diagram of switching apparatus embodying the invention;

Fig. 11*a* is a group of wave form diagrams of assistance in explaining the operation of Fig. 11;

Figures 18, 18A, 19:
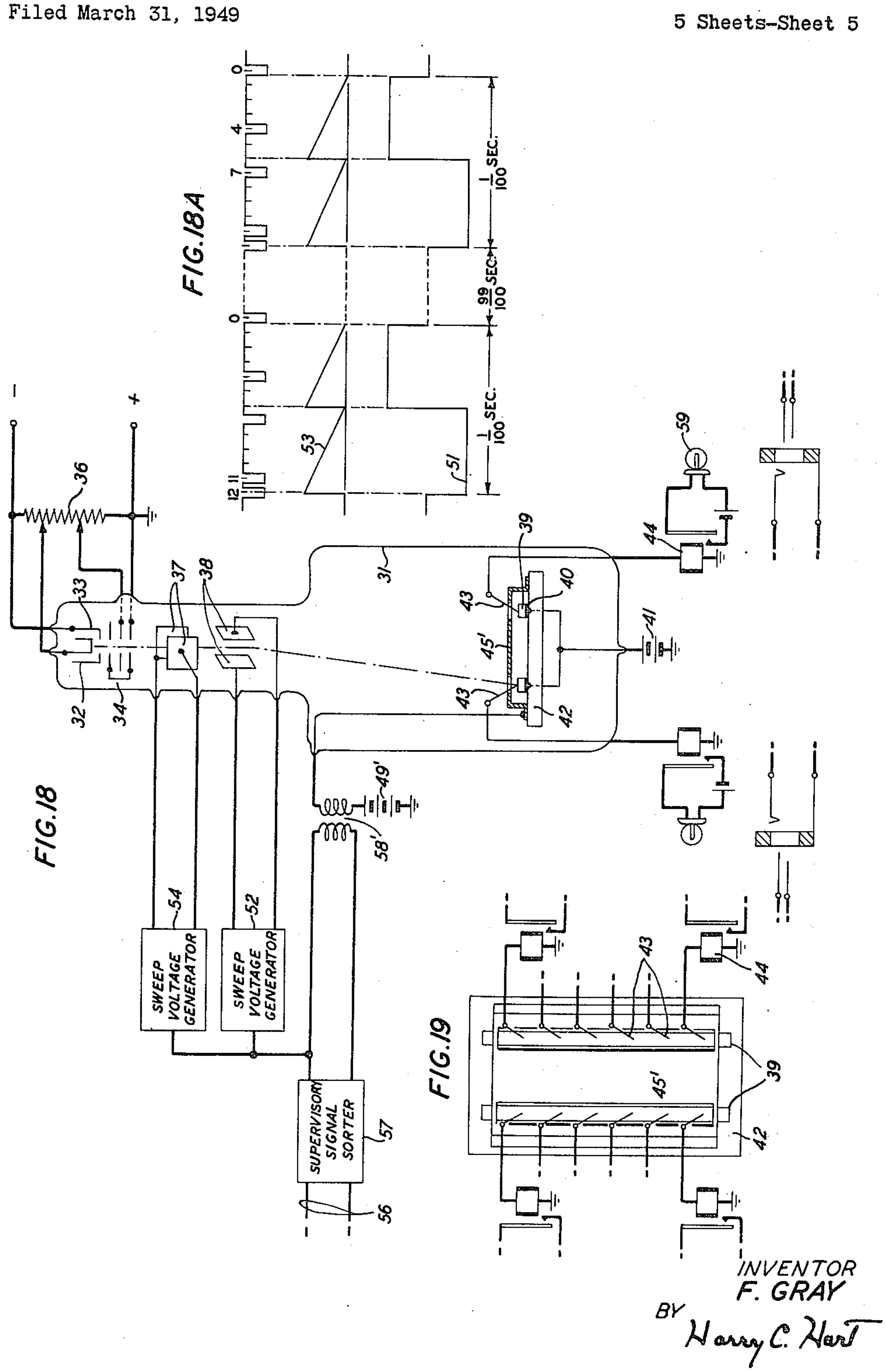
Fig. 18 is a schematic diagram of modified switching apparatus embodying the invention.

Fig. 18*a* is a group of wave form diagrams of assistance in explaining the operation of Fig. 18; and Fig. 19 is a plan view showing the target construction of Fig. 18.

Figure 1:
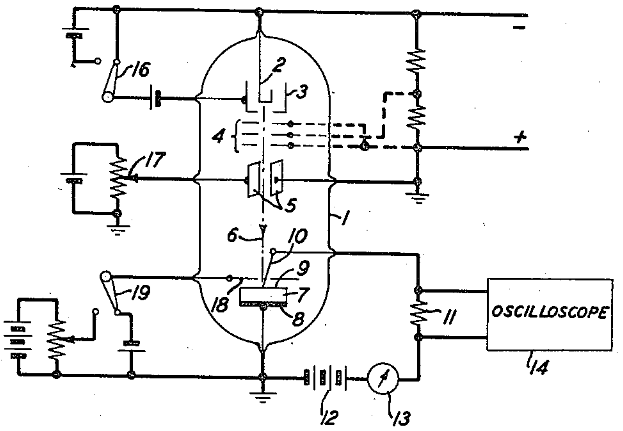

Referring now to the figures, Fig. 1 is a schematic diagram of simplified apparatus embodying the invention. This figure shows a tube comprising an evacuated envelope 1 containing the normal electrodes of an electron gun, namely, a cathode 2, a control grid 3, electron-optical beam-focussing electrodes 4 and beam-deflecting elements 5. All of these elements may be conventional. The target on which the electron beam 6 impinges, when suitably directed, comprises a block 7 of semiconductor material such as N-type germanium, mounted on a metallic base 8, which serves as an electrical connection. The surface 9 of the block 7 which faces the electron gun is provided with a film of insulation. With germanium or silicon as the material of the semiconductor block 7, a convenient way of obtaining the necessary insulating film is to oxidize the surface of the block to form a thin layer of germanium oxide or silicon oxide on its surface. Each of these compounds is a good insulator with a sufficiently high dielectric constant, and each of them has the property of emitting secondary electrons in a ratio greater than unity, when bombarded by primary electrons whose energy is 1,000 volts or so.

It has been found that heating a germanium block to about 450° C. for two hours or so in a moist atmosphere results in the formation on the block surface of a thin insulating film of germanium oxide which has all of the requisite properties. However, any insulator, and any method of applying the film, are suitable, those having high resistance and a secondary electron emission ratio in excess of unity being preferred. An insulating material which has an insufficient secondary emission ratio but which is otherwise adequate can be given a secondary emission ratio in excess of unity by applying to its surface, as by an evaporation process, a number of separate distinct droplets or specks of a suitable material such as nickel or magnesium.

A wire 10 with a sharpened end makes point contact with the surface 9 of the germanium block which faces the electron gun. This electrode, which is termed the collector, pierces the film of insulation to make contact directly with the semiconductor material. This collector electrode 10 may be of Phosphor-bronze, tungsten, or other suitable metal. It is connected through an output resistor 11 and a battery 12 to the base 8. The current in the output circuit may be observed on a meter 13, or on an oscilloscope 14 connected across the output resistor 11. The contact which this collector electrode 10 makes with the germanium block 7 is preferably an electrical rectifier contact, offering low resistance to current flowing in the forward direction and a higher resistance to current flowing in the reverse direction. It is advantageous to operate this contact in the reverse direction; i. e., to pole the battery 12 so that the contact has the higher resistance. This permits it to work into a larger output load 11 and gives greater power output. The electron focussing system focusses the beam 6 of electrons on the block 7. This beam can be turned on and off by application of a suitable negative voltage to the control electrode 3, as by operating a switch 16. A voltage is applied to sweep plates 5, and can be varied, as by adjustment of a movable tap 17, to control the location of the beam 6 with respect to the point contact of the collector electrode 10. An auxiliary anode 18 is located in front of the germanium block 7, to control the flow of secondary electrons from its surface 9. This is accomplished by means of a switch 19, which can bias the electrode 18 either positively or negatively with respect to the germanium block 7. Because the secondary emission ratio of the material of the insulating film on the block surface 9 is greater than unity, each electron in the beam ejects more than one secondary electron from the surface on which it impinges. If the auxiliary anode 18 is biased negatively, it prevents secondary electrons from flowing away and there is a net flow of electrons to the block. If the electrode is biased positively, it draws more secondary electrons away from the block than arrive in the beam, and there is a net flow of electrons away from the block.

The new conduction effect with which the invention deals does not occur when an electron beam impinges on a clean semi-conductor surface, but it is instructive to consider the results obtained when the surface of the block is clean, for they aid in describing the new conduction effect and in differentiating it from a previously known effect which is commonly termed "induced conductivity."

Figure 2:
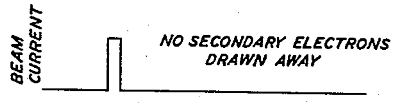
Figure 3:
Figure 4:
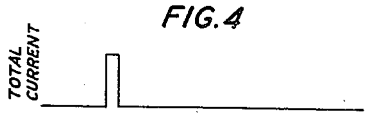
Figure 5:
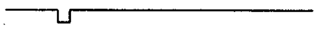

Figs. 2 to 9, inclusive, illustrate certain characteristics of conduction effects of different kinds as determined with the tube of Fig. 1. To obtain these characteristics, the deflecting voltage source 17 of Fig. 1 is adjusted so that the electron beam 6 strikes the semiconductor block immediately adjacent to the collector 10. The auxiliary electrode 18 is first biased negatively, so that no secondary electrons are drawn away from the block. The beam is then pulsed, that is, turned on for a short interval of time, and the change in collector current is noted on the meter 13 or the oscilloscope 14. When the collector current has returned to its normal value, the procedure is repeated with the auxiliary electrode 18 biased positively, so that it draws secondary electrons away from the block and causes a net flow of electrons away from its surface. Figs. 2 and 3 show, on an enlarged scale, the current pulses in the beam during these two procedures, that is, they show the beam current as a function of time. Figs. 4 and 5 show the net electron current pulses to the semiconductor during these two procedures. It is to be noted that the net electron current is negative when secondary electrons are drawn away from the block.

Figure 6:
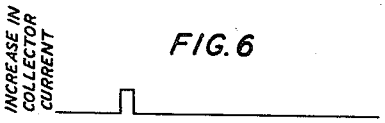
Figure 7:
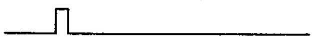

Figs. 6 and 7 show the corresponding changes in the collector current when the pulsed beam impinges on a clean germanium surface. The increases in collector current reproduce the corresponding current pulses of the beam in amplified form, and they cease when the beam current is turned off. The current in the output pulses is about ten times greater than the beam current. The increase in the conductance of the clean germanium is not caused by the beam charging the latter electrically, for the increase is independent of the sign of the net electron current to the block 7. The increased conductance is caused by the energy of impact of the primary electrons on the germanium, and it is thus independent of the sign of the total electron current. This impact type of conductance increase is known in the electronic art as "induced conductivity," and it is not a subject of the present invention.

Figure 8:
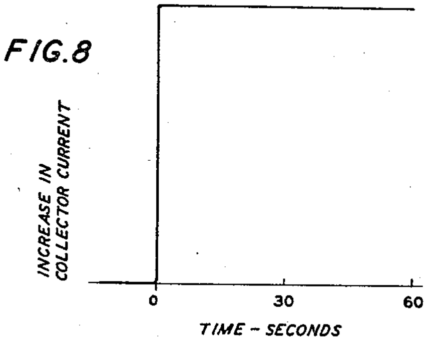
Figure 9:
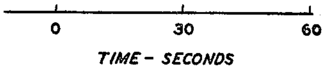

Figs. 8 and 9 show the corresponding changes in the collector current for a germanium block which has received the preliminary oxidization treatment described above to coat its surface with a thin insulating film of germanium oxide. Fig. 8 shows the increase in collector current caused by the pulsed beam, when no secondary electrons are drawn away from the block, and there is a net flow of electrons to its surface. The increase in collector current is about 160 times the beam current, and the increased current continues to flow after the termination of the pulse; that is, it continues to flow after the beam is turned off or removed by deflection. Fig. 9 shows the collector current when the beam is pulsed and secondary electrons are drawn away from the block to give a net flow of electrons away from its surface. The figure shows that there is no detectable change in the collector current under these conditions. The increase in current shown in Fig. 8 corresponds to a large change in the conduction, through the germanium block, from the base electrode to the collector electrode. This is a new conduction effect that occurs when the surface of the semiconductor is covered with a thin insulating film of oxide. The new effect is not bombardment-induced conductivity, it is not caused by the energy of impact of the electrons in the primary beam, for it does not occur when the beam bombards the surface and secondary electrons are drawn away to give a net flow of negative charges away from the surface of the block; but it does occur when the current of secondary electrons is suppressed and there is a net flow of negative charge to the block surface. The new effect is apparently caused by the electron beam charging the surface of the insulating film to a negative potential, thereby altering the conductance of the semiconductor-to-collector contact.

Figure 10:
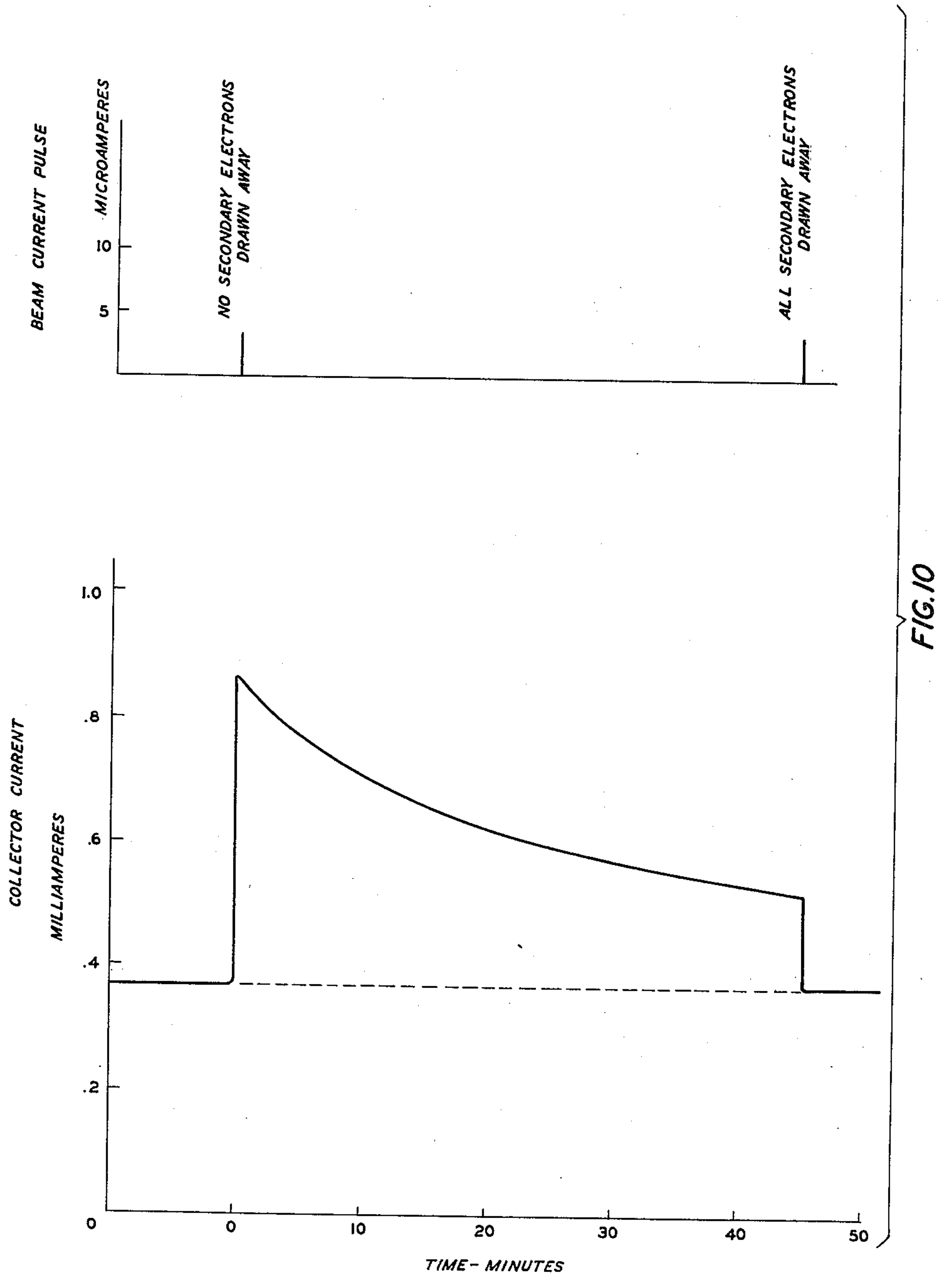

The persistence of the collector current after the termination of the initiating pulse is illustrated in Fig. 10, which was determined with the tube of Fig. 1 and the oxidized germanium block described above. The normal current in the collector circuit is .37 milliampere. With the auxiliary anode of Fig. 1 biased negatively so that no secondary electrons are drawn away from the block the beam was turned on for 1/100 second, at the time indicated as zero in Fig. 10. This caused a .5 milliampere increase in the collector current, and the increase in current continued to flow after the beam was turned off. It decreased slowly with time, but it was still flowing after forty-five minutes. The beam was then pulsed again with the auxiliary anode biased positively to draw secondary electrons away from the surface of the block. This removes the negative charge on the oxide film, and the increase in the collector current drops to zero; that is, the current returns to its normal value of .37 milliampere. This last characteristic is an important feature of the present invention, for it permits an increase in collector current to be held for a predetermined period, and to be then erased at the end of that period, thus releasing the output circuit for subsequent operations.

Another characteristic of the new conduction effect is its dependence on the net flow of electrons to the insulating film near the collector contact. The increase in conductance decreases as the current in the beam is reduced. It also decreases as more and more secondary electrons are drawn away from the surface of the semiconductor block, and there is no increase in conductance when the secondary current causes a net flow of electrons away from the surface. A further characteristic of the effect is its dependence on the location of the beam with respect to the collector contact. A large increase in conductance occurs only when the beam impinges on the semiconductor block very near to the collector contact. The effect decreases as the beam is deflected away from the contact, and it does not occur when the point of impact of the beam on the block is more than 1/16 inch away from the collector contact point. As a result of these characteristics the output current can be controlled by the different means. Referring to Fig. 1, it can be varied by control of the current in the electron beam 6; it can be varied by deflecting the beam 6 with respect to the collector contact 10; and it can be varied by the voltage which is applied to the auxiliary anode 18 and controls the secondary electron current drawn from the surface of the block.

Similar conduction effects are caused by an electron beam impinging on P-type germanium whose surface is covered with a thin insulating film of germanium oxide; and on silicon when surface is covered with a thin insulating film of silicon oxide. For best results the polarity of the collector bias potential source is to be correlated with the conductivity characteristics of the material so that the collector shall operate in its reverse direction.

The thickness of the insulating film determines the rate of decay of the conductance, after the beam is turned off, but has little effect, if any, on the sensitivity of the apparatus. In general, the thicker the film, the slower is the decay. In the case of oxide films, their thicknesses can be determined by controlling the temperature and duration of the oxidization treatment. By controlling these factors, films can be made which allow the altered conductance to drop to half value in a few seconds after the beam is turned off, and other films can be prepared to hold their output current for hours after the beam is turned off. It is preferable to use a film with a short decay time when this is consistent with other requirements, because a film having a short decay time does not require any particular precautions in regard to stray electron current in the tube.

Figures 11, 11A, 12:
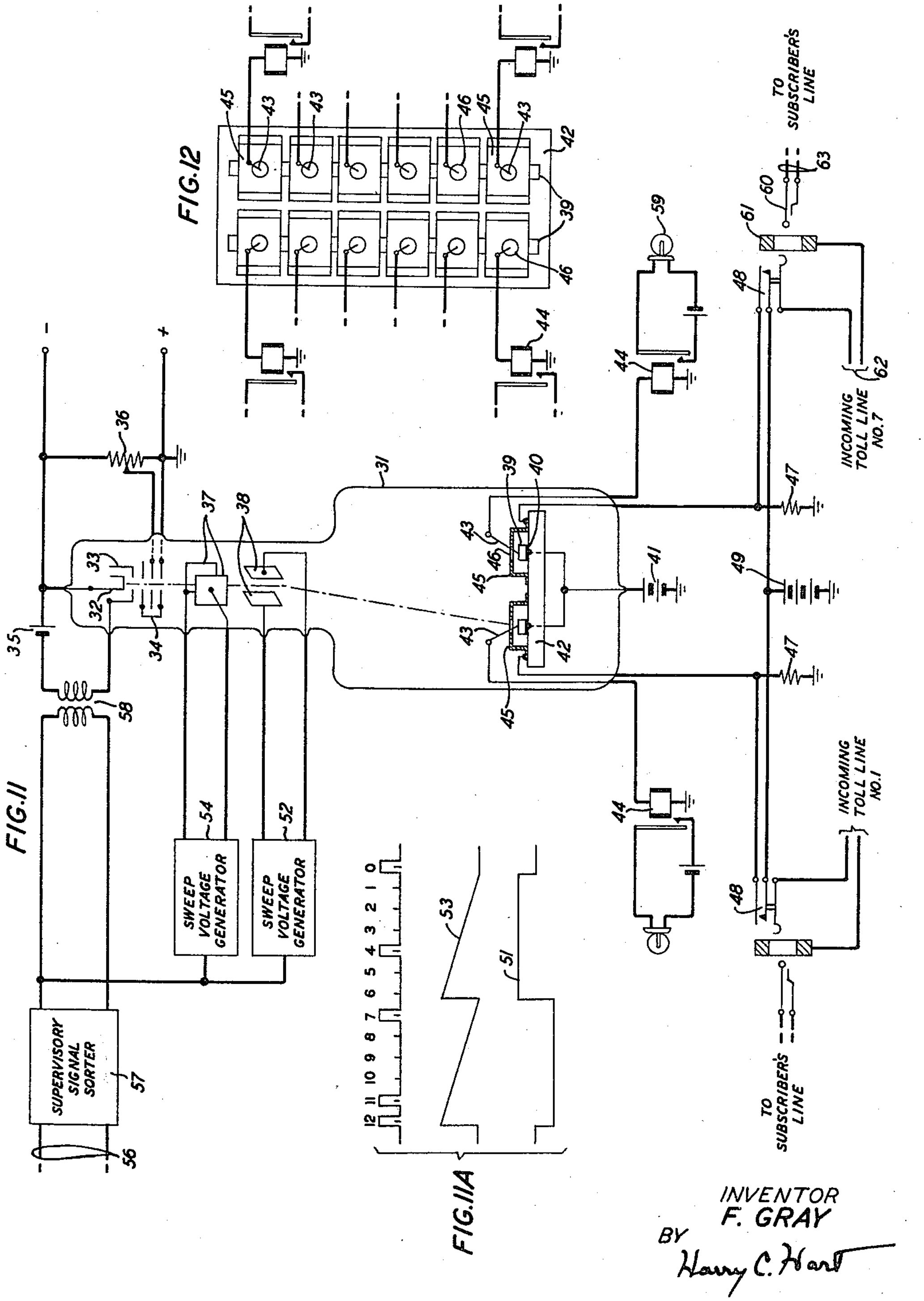
Fig. 12 is a plan view showing the target construction of Fig. 11.

Fig. 11 illustrates the application of the invention to a supervisory system for telephone calls where it operates to convert a sequence of pulses appearing on a single input conductor, and following one another in time after the fashion of time division multiplex systems, into a quasi-permanent pattern or distribution of electrical conditions appearing on a plurality of output conductors. This system utilizes the feature of the invention by which it converts a fleeting input signal into an enduring output signal. The apparatus comprises an evacuated envelope 31 containing an electron gun comprising a cathode 32, a control electrode 33 and beam-focussing electrodes 34 each of which is arranged to be supplied with suitable operating bias potentials by a battery 35 and a potentiometer 36, longitudinal deflecting elements 37 and lateral deflecting elements 38 which may be conventional, and an electron beam target which may comprise two strips 39 of high back voltage germanium, arranged side by side. Each strip may be provided on its lower face with a conducting film 40 of metal which serves as a base electrode, and these base electrodes may be connected together and to the positive terminal of a suitable potential source 41. The strips may together be mounted side by side on a supporting base 42 of insulating material. Each of the germanium strips is provided on its upper surface with a film of insulating material, for example germanium oxide applied in the manner described hereinabove, and each of a plurality of wires 43 with sharpened ends, arranged side by side, pierces the insulating film to make point contact with the germanium material 39 below it. These individual point contact electrodes, which may be termed collectors, are connected by way of the magnetizing windings 44 of a plurality of relays and by way of ground to the negative terminal of the potential source 41. Each of the collector wires 43 is provided with an individual erasing electrode 45 each of which may comprise a small metal plate having a hole 46 pierced through its center, and mounted on the insulating plate 42. The individual erasing electrodes 45 are connected by way of high resistors 47 to ground and also by way of a switch 48 which is normally open to the positive terminal of a potential source 49. The construction of the target assembly is shown in detail in the plan view of Fig. 12.

Instead of each single strip of germanium, a plurality of germanium blocks, equal in number to the number of point contact electrodes, may be employed instead. The single strips 39 are considered simpler, and, in view of the small area of influence of the electron beam on the insulated surface, equally satisfactory.

The lateral deflecting elements 38 are provided with a voltage 51 (Fig. 11*a*) having a square wave form derived from a sweep voltage generator 52, for example a multivibrator, whose operation is synchronized with a train of incoming pulses. Similarly the longitudinal deflecting elements 3 are supplied with a voltage 53 of sawtooth wave form which is the output of a second sweep voltage generator 54 which may be of conventional construction and may be driven by and synchronized with pulses of the incoming train or, if preferred, it may be driven by the output of the multivibrator 52.

With the sweep voltage generators 52, 54 arranged in this manner, an electron beam originating at the cathode 32 and focussed by the electron-optical structure 34 is deflected by the lateral deflecting elements 38 onto one germanium strip 39 or the other, and, for each such deflection, is swept longitudinally of the strip by the voltage 53 on the longitudinal deflecting elements 37.

In operation it is to be conceived that a small fraction of the available channel time of a telephone toll system is assigned to a group of supervisory pulse signals, which are indicative of the activity distribution among the members of a group of incoming toll lines. With the help of suitable multiplexing equipment the sending end operator establishes the correct arrangement of pulses in the group. Such a group is indicated in the upper part of Fig. 11*a*. It may comprise, in a simple case, a sequence of 12 available pulse positions or time slots, any one or all of which may contain a pulse, and preceded by a group marker pulse position which always contains a pulse designated No. 0, which serves to initiate the sweep operations. The whole train may endure, for example 1/100 second and it may be followed by another train after an interval of one second, or even a much longer period such as 10–30 seconds. The supervisory pulse group may be separated at the incoming terminals 56 of the apparatus from the message signals by suitable sorting equipment 57 and may be applied as positive voltage pulses to the beam modulating electrode 33 which is normally biased to cut-off, for example by way of a transformer 58, each pulse operating individually to turn the beam on when it arrives.

In the example shown, pulses are present in the pulse train at positions Nos. 4, 7, 11 and 12. In this arrangement the cathode beam is first briefly turned on in the course of its longitudinal sweep along the first germanium strip at the instant at which the electrons of the beam are impacting the insulating film in the neighborhood of collector No. 4. It is turned on again briefly at the instants at which, in the course of its longitudinal sweep along the second strip, it is in the vicinity of collectors Nos. 7, 11 and 12. The erasing electrodes 45 are held at negative potentials, and the negative charges placed by the beam on the insulating film in the neighborhood of these several collectors 43 are thus not erased but remain there for a matter of minutes. Therefore, from the standpoint of a period of the order of a few seconds, they are quasipermanent. While present they act in the manner described in connection with Fig. 1 to modify the conductivity of the semiconductor material between the base electrode 40 and each of the individual collector electrodes 43 in question. Thus increases are developed in the currents flowing through the windings of relays 44 Nos. 4, 7, 11 and 12. These current increases are sufficient to pull up the relay armatures and so to light indicator lamps 59.

These indicator lamps 59 may be arranged on a telephone operator's switchboard and each lamp may identify an incoming toll line. By the foregoing sequence of events, lamps have been lighted which are indicative of incoming calls on lines Nos. 4, 7, 11 and 12. Due to the decay of the surface charge described above, each of the collector currents will eventually fall to the point at which the relay armature of the corresponding relay 44 is dropped and the lamps 59 are extinguished. This, however, is a matter of minutes, rather than seconds, and before this event occurs it may be expected that the sending end operator will send another supervisory pulse train similar to the one shown in Fig. 11*a*, thus to replenish the surface charges on the insulating film and maintain the illumination of the supervisory switchboard lamps 59 at the receiving end of the line.

The receiving operator, who may have been otherwise engaged for several seconds, sees before her the illuminated lamp 59 which indicates an incoming call. She then inserts a plug 60 into a jack 61 and completes a message circuit from an incoming toll line 62 to a subscriber's line 63. The plug 60, which may be otherwise conventional, may be modified in well-known fashion so that its insertion in the jack 61 also closes the switch 48, thus applying the positive potential of the battery 49 to the particular erasing electrode 45 associated with the call being completed. With this positive potential on the erasing electrode 45, the surface charge on the insulating film is wiped off on the next passage of the electron beam across the collector 43 because, in the manner described above, secondary electrons released from the insulating film in numbers greater than unity by bombardment by the primary electrons are now drawn away from the insulating film to the secondary anode 45, thus removing the surface charge. As a result the holding current in the relay winding 44 of the same designation is reduced to its original value.

Insertion by the operator of her plug 60 into any one of the twelve jacks 61 similarly enables her to establish a message circuit from an incoming line 62 to a subscriber's line 63 and extinguishes the supervisory lamp 59.

Fig. 18 shows a modification of Fig. 11 which is designed to accept supervisory signals in the form of negative pulses which are applied to and exert their control on a single erasing electrode which is normally in erasing condition. In this modification, each of the supervisory lamps is automatically extinguished when the calling signal ceases. Elements which are similar to the elements of Fig. 11 are designated by the same reference numerals. The control electrode 33 is biased positively so that the beam is normally on. The collectors 43 are provided with a common erasing electrode 45′ located in front of the germanium strips 39 as shown in greater detail in Fig. 19, which is a plan view of the target assembly. This electrode 45′ is biased positively by battery 49′. It normally draws secondary electrons away from the insulating film on the germanium 39, and it thus prevents the beam from imparting a negative charge to this film and increasing the currents in the circuits of the collectors 43. As before, the supervisory pulse groups are segregated by a sorter 57 and applied to the sweep voltage generators 52, 54 to cause the beam to sweep first along one strip and then along the other. Suitable wave forms 51, 53 for the sweep voltages are indicated in Fig. 18*a*. The supervisory group indicator or "zero" pulses in these groups, as well as the call indicator pulses, are negative in sign, and these negative pulses are applied to the common erasing electrode 45′ by way of a transformer 58′. A pulse in any particular pulse position, for example position No. 4, drives the erasing electrode 45′ negative when the beam is impinging on the oxide film adjacent to collector No. 4. The beam thus charges this area of the film negatively, and causes an increase in the output current from collector No. 4. This increase persists after the passage of the beam, and it operates to close the associated relay 44, and lights the signal indicator lamp 59 for speech circuit No. 4. This indicator lamp remains lighted as long as there are incoming pulses in pulse position No. 4, and it informs the local operator that a call is arriving on incoming toll line No. 4. When the called operator has established her connection with the calling operator, the latter stops sending pulses in time pulse position No. 4, and on the next passage of the beam, the erasing electrode is at the positive potential of the battery 49′ when the beam passes collector No. 4. The auxiliary electrode 45 thus erases the negative charge on that area of the oxide film, and the collector current drops back to its normal value. The associated relay 44 opens, and the signal indicator lamp No. 4 is automatically extinguished. This modification has advantage of automatically releasing the output circuits without other special means for accomplishing this end; while the modification of Fig. 11 has the advantage that the cathode beam is normally turned off, which makes for longer tube life.

The foregoing illustrative embodiments were chosen for the purpose of describing the invention in a relatively simple manner. The device can, however, be constructed in other forms, and it can be utilized to perform more complicated operations. For operations involving many output circuits, it is desirable to arrange the collectors in an extended two-dimensional array and to bring the collector leads out in a manner that does not interfere with the electron beam. Two alternate output assemblies with these desirable features are shown in Figs. 13 to 16, inclusive.

Figure 17:
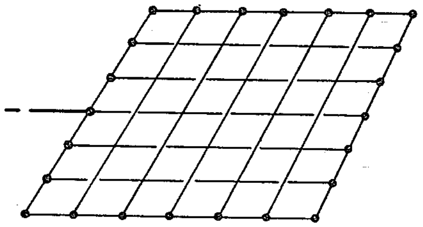
Fig. 17 is a perspective view of an erasing electrode suitable for use with the targets of Figs. 13 and 14.
Figures 13, 14:
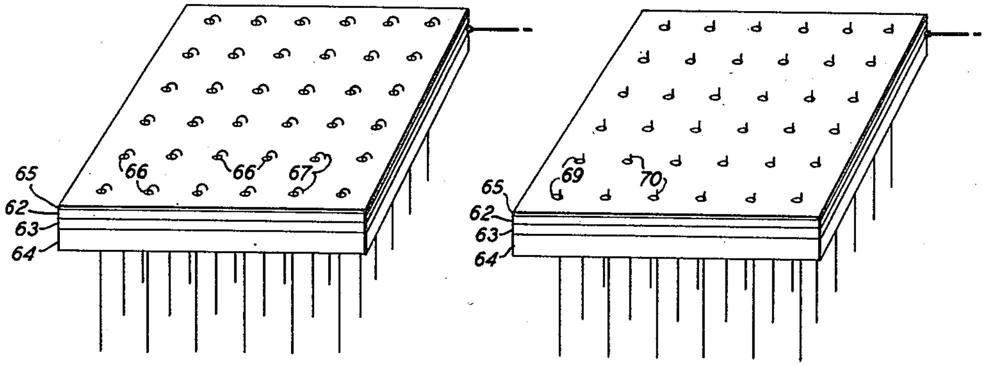
Figs. 13 and 14 are perspective views of target constructions alternative to that of Fig. 12.
Figure 15:
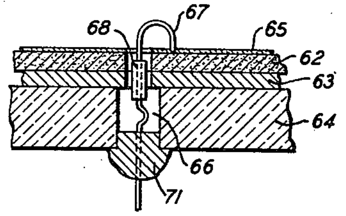
Figs. 15 and 16 are sectional views of the targets of Figs. 13 and 14, respectively.
Figure 16:
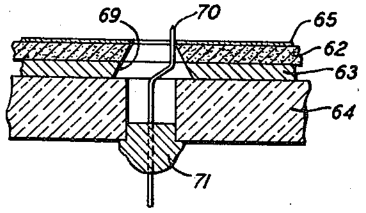

Figure 13 shows a target assembly in which the target itself comprises a single sheet 62 of semiconductor material such as germanium, backed by a metallic base 63, mounted on an insulating support 64, and bearing a superficial film 65 of insulation. A multiplicity of small holes 66 are drilled through this assembly, one for each collector wire 67, and the wires are brought in from the back of the target through insulating sleeves 68 and bent over to make point contacts with the front surface of the germanium. The construction of a collector unit is shown in detail in the enlarged cross-sectional view of Fig. 15. A common erasing electrode may be constructed in the form of a wire grid or screen, as shown in Fig. 17, located in front of the semiconductor sheet, and its openings may register with the collector units to permit free passage of the primary electrons of the beam to these elements.

Fig. 14 shows an alternative construction for the target. It is similar to the one just described, but the holes 69 for the collector wires 70 are tapered to form sharp edges. Each collector wire may be supported in a button 71 of insulating material, in a manner to bear against the sharp inner edge of one of these tapered holes. The construction of such a collector unit is shown in detail in Fig. 16 which is an enlarged cross-sectional view of a unit.

What is claimed is:

1. Apparatus which comprises a body of semiconductor material, a metallic electrode making contact therewith, the resistance of said contact being sensitive to the presence of electric charge in its vicinity, a film of insulation on a surface of said body adjacent said contact, and means for bombarding said film with electric charges to produce a localized surface charge on said film.

2. In combination with apparatus as defined in claim 1, means for removing said localized surface charge at will.

3. Apparatus as defined in claim 2 wherein the bombarding charges are electrons and wherein said charge-removing means comprises an auxiliary electrode disposed to withdraw from said film secondary electrons which may be released by said bombardment.

4. Apparatus which comprises a body of semiconductor material, a metallic electrode making contact with said body, the resistance of said contact being sensitive to the presence of electric charge in its vicinity, a film of insulation on a surface of said body adjacent said contact, means for bombarding said film with electric charges to apply thereon a surface charge, and means for regulating the persistence of said surface charge.

5. Apparatus which comprises a body of semiconductor material, a superficial film of insulation on a face of said body, electrodes in contact with said body, a work circuit interconnecting said electrodes, a source of electrons external to said body and to said circuit, and means including said source for controllably applying an electric surface charge to said film, thereby to alter the resistance of said body and the current in said work circuit.

6. Apparatus as defined in claim 5 wherein at least one of the electrodes makes rectifier contact with the body and wherein the resistance of said rectifier contact is sensitive to the presence of an electric charge on the surface of the film.

7. Apparatus as defined in claim 6 wherein said one electrode makes point contact with said body.

8. Apparatus as defined in claim 7 wherein said point contact electrode pierces the insulation film to make contact with the body below the film.

9. Apparatus which comprises a body of semiconductor material, a superficial film of insulation on a face of said body, electrodes in contact with said body, a work circuit interconnecting said electrodes, means for projecting a focussed beam of electrons onto said film, and means including said beam-projecting means for controllably applying an electric surface charge to said film, thereby to alter the resistance of said body and the current in said work circuit.

10. Apparatus as defined in claim 9 wherein the charge-applying means comprises means for modulating the strength of the electron beam.

11. Apparatus as defined in claim 9 wherein the charge-applying means comprises means for deflecting the electron beam to alter its point of impact on said film.

12. Apparatus as defined in claim 9 wherein the charge-applying means comprises beam-modulating means and beam-deflecting means.

13. In combination with apparatus as defined in claim 9, means for controllably removing the applied electric charge.

14. Apparatus as defined in claim 13 wherein the film is characterized by a secondary charge emission ratio in excess of unity and wherein the charge-removing means comprises an electrode disposed in proximity to said film, which electrode is normally held at a potential not greater than that of said body, means for raising the potential of said electrode above that of said body to establish a charge-withdrawing field between said film and said electrode, and means for simultaneously bombarding said film with primary charges, whereby secondary charges generated by said bombardment are withdrawn by said field.

15. Apparatus which comprises a body of semiconductor material, a superficial film of insulating material on a face of said body, a plurality of individual point contact electrodes individually piercing said film and making contact with said body at spaced locations, individual work circuits connected to the several electrodes, means for generating an electron beam, and means for selectively directing said beam onto said film and to said several locations.

16. Apparatus which comprises a body of semiconductor material, a superficial film of insulating material on a face of said body, a plurality of individual point contact electrodes individually piercing said film and making contact with said body at spaced locations, individual work circuits connected to the several electrodes, means for generating an electron beam, means for sweeping said beam along said film and successively over said several locations, and means for modulating the strength of said beam, thereby to apply electric charges to said film at selected ones of said locations.

17. Apparatus which comprises means for generating a cathode beam, a target in the path of said beam, said target comprising a body of semiconductive material, a base electrode making low resistance contact with a part of said body, a film of insulation on the surface of said body facing said beam and disposed to be impacted by said beam when said beam is suitably directed, an electrode making rectifier contact with said body in the vicinity of the region of impact, means for utilizing the current of said electrode, and means for controllably directing said beam onto said target.

18. Apparatus which comprises means for generating a cathode beam, a target in the path of said beam, said target comprising a body of semiconductive material, a base electrode making low resistance contact with a part of said body, a film of insulation on the surface of said body facing said beam and disposed to be impacted by said beam when said beam is suitably directed, an electrode making rectifier contact with said body in the vicinity of the region of impact, means for utilizing the current of said electrode, means for controllably directing said beam onto said target to charge said film, and means for controllably removing the charge so applied to said film.

19. Apparatus which comprises means for generating a cathode beam, a target in the path of said beam, said target comprising a body of semiconductive material, a base electrode making low resistance contact with a part of said body, a film of insulation on the surface of said body facing said beam and disposed to be impacted by said beam when said beam is suitably directed, said film having a secondary electron emission ratio which exceeds unity, an electrode making rectifier contact with said body in the vicinity of the region of impact, an auxiliary electrode disposed out of contact with said film, a controllable potential source for said auxiliary electrode, means for controllably directing said beam onto said target to charge said film, means including said auxiliary electrode, said source, and said beam-generating means for controllably removing charge from said film, and means for utilizing the current of said rectifier contact electrode.

20. A beam tube target which comprises a block of semiconductor material, a film of insulating material overlying substantially the entire area of one face of said block, a plurality of apertures extending through said block from face to face thereof, a plurality of point contact electrodes piercing said film and making contact directly with said block, and a conductor connected to each of said electrodes, one of said conductors extending through each aperture and being insulated from the walls of said aperture.

21. A beam tube target which comprises a block of semiconductor material, a film of insulating material overlying substantially the entire area of one face of said block, said block having an edge in the plane of said face and of said film, and a plurality of metal wires of small diameter engaging said edge at separated points thereof and otherwise insulated from each other.

22. Apparatus for converting a train of pulses appearing on an input conductor into a related quasi-permanent space distribution of electrical conditions among a plurality of output conductors which comprises an evacuated envelope, electron beam-generating means, beam-modulating means, beam-deflecting elements and a beam-target within said envelope, said target comprising a body of semiconductive material, a film of insulation on the surface of said body facing said beam and disposed to be impacted by said beam when said beam is suitably directed, a plurality of output electrodes making rectifier contact with said body at spaced points thereof, a plurality of loads individually connected to each of said several electrodes, means including said beam-deflecting elements for sweeping said beam over said film to impact said spaced points in succession, and connections for applying the pulses of said train to said beam-modulating means.

23. In combination with apparatus as defined in claim 24, means for erasing said space distribution of conditions which comprises an auxiliary anode disposed in proximity to said target and out of the path of said beam, means for applying a potential to said target for withdrawing secondary electrons from said target, and means for sweeping said beam over said film to pass said spaced points in succession while said potential is applied.

24. Apparatus for converting a train of negative pulses appearing on an input conductor into a related quasi-permanent space distribution of electrical conditions among a plurality of output conductors which comprises an evacuated envelope, electron beam-generating means, beam-deflecting elements and a beam-target within said envelope, said target comprising a body of semi-conductive material, a film of insulation the surface of said body facing said beam and disposed to be impacted by said beam when said beam is suitably directed, a plurality of output electrodes making rectifier contact with said body at spaced points thereof, a plurality of loads individually connected to each of said several electrodes, an auxiliary anode disposed in proximity to said target and out of the path of said beam, said target being normally biased to a positive potential whereby the charge applied to said film by impact of said beam is immediately nullified by withdrawal of secondary electrons, means including said beam-deflecting elements for sweeping said beam over said film to impact said spaced points in succession, and connections for applying the negative pulses of said train to said auxiliary electrode whereby a charge applied to said film by impact of said beam at a specified point is not nullified and the electric condition of the load connected to one of said rectifier electrodes persists until said beam is subsequently swept over said point.

FRANK GRAY.

REFERENCES CITED

The following references are of record in the file of this patent:

UNITED STATES PATENTS

| Number | Name | Date |
|---|---|---|
| 2,175,692 | Iams | Oct. 10, 1939 |
| 2,246,283 | Zworykin | June 17, 1941 |
| 2,458,652 | Sears | Jan. 11, 1949 |
| 2,460,093 | Law | Jan. 25, 1949 |

OTHER REFERENCES

M. F. Mott: R. W. Gurney; "Electronic Processes in Ionic Crystals," published by Oxford University Press, New York, 1940.

K. A. Yamakawa; Thesis, Princeton (1949).

Crystal Counters by Robert Howstadter in the April 1949 copy of Nucleonics, published by McGraw Hill.

The Crystal Counter—Utrecht Dissertation 1945 by P. J. Van Heerden.